US007714871B2

(12) United States Patent
Lim

(10) Patent No.: US 7,714,871 B2
(45) Date of Patent: May 11, 2010

(54) SYSTEM AND METHOD FOR CONTROLLING DISPLAY OF MOBILE TERMINAL

(75) Inventor: Sung-Ki Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 643 days.

(21) Appl. No.: 11/012,684

(22) Filed: Dec. 16, 2004

(65) Prior Publication Data

US 2005/0134594 A1 Jun. 23, 2005

(30) Foreign Application Priority Data

Dec. 17, 2003 (KR) ..................... 10-2003-0092655

(51) Int. Cl.
*G06F 13/14* (2006.01)
*G09G 5/39* (2006.01)

(52) U.S. Cl. ........................ 345/519; 345/520; 345/531

(58) Field of Classification Search ................. 345/531, 345/530, 544, 547, 501, 519, 520
See application file for complete search history.

(56) References Cited

U.S. PATENT DOCUMENTS 5,463,422 A * 10/1995 Simpson et al. .......... 348/390.1
5,812,150 A * 9/1998 Lum .......................... 345/522
5,862,150 A * 1/1999 Lavelle et al. ............... 714/732
6,057,860 A * 5/2000 Hoffert et al. ............... 345/501
6,097,446 A * 8/2000 Imbert et al. ................ 348/715
6,687,811 B1 * 2/2004 Yamada ...................... 712/227
6,820,209 B1 * 11/2004 Culbert et al. .............. 713/501
6,950,083 B1 * 9/2005 Lee ............................ 345/87
6,970,173 B2 * 11/2005 Ciolac ......................... 345/544
7,002,604 B1 * 2/2006 Barrus et al. ................ 345/649
7,012,610 B2 * 3/2006 Turner et al. ................ 345/519
7,027,061 B1 * 4/2006 Dotson et al. ............... 345/545
7,092,585 B2 * 8/2006 Morita et al. ............... 382/298
7,240,087 B1 * 7/2007 Walker ....................... 709/200
2002/0116570 A1 * 8/2002 Miyamoto .................. 711/103
2003/0048275 A1 * 3/2003 Ciolac ........................ 345/544
2003/0095125 A1 5/2003 Lim et al.
2004/0189439 A1 * 9/2004 Cansino ...................... 340/5.2

FOREIGN PATENT DOCUMENTS

EP 1217602 6/2002
EP 1411490 4/2004
KR 10-0454994 11/2004
WO WO 03/001498 1/2003

OTHER PUBLICATIONS http://searchcio-midmarket.techtarget.com/sDefinition/0,,sid183_gci213867,00.html#.*
Korean Office Action Dated Oct. 27, 2005.
EP Office Action dated Mar. 2, 2005.

* cited by examiner

*Primary Examiner*—Ryan R Yang
(74) *Attorney, Agent, or Firm*—KED & Associates LLP

(57) ABSTRACT

A system and method are provided for controlling a display unit of a mobile terminal which allows for enhanced display capabilities. A controller of the mobile terminal includes an output buffer region allocated within an external memory of the controller to receive and store screen data, and a display interface to transmit the screen data directly to the display unit. Screen data is stored and transmitted based on a clock cycle associated with an internal bus of the controller, thereby increasing display speed and maximizing the capabilities of a high performance, high speed display unit.

26 Claims, 3 Drawing Sheets

SYSTEM AND METHOD FOR CONTROLLING DISPLAY OF MOBILE TERMINAL

BACKGROUND OF THE INVENTION

1. Field of the Invention

The invention relates to a mobile terminal and, more particularly, to a system and method for controlling a display unit of a mobile terminal.

2. Background of the Related Art

In general, screen information (data) to be displayed on a display unit of a mobile terminal is configured and stored in an external memory such as a Random Access Memory (RAM). There are two methods typically used to display the screen information stored in the external memory.

A first related art display method is shown in FIG. 1. In this first method, a controller, such as a central processing unit (CPU) is used to configure and output the screen information. More specifically, as shown in FIG. 1, a controller 13 records screen data in a screen output buffer (not shown) of an external memory 12, reads the screen data from the screen output buffer, and outputs the data to a display unit 11.

However, this reading/writing of display data from/into the external memory 12 and outputting data to the display unit 11 requires multiple clock cycles, thus restricting performance of the display unit 11. More specifically, by using this first display method, the reading/writing time associated with the external memory 12 and the controller 13, as well as a transfer rate between the external memory 12 and the controller 13, limit the display speed, and thus the type of display unit that can be used with the related art mobile terminal.

A second related art display method is shown in FIG. 2. In this second method, screen data is configured by a controller and output by an external memory. More specifically, as shown in FIG. 2, a controller 23 configures screen data in a screen output buffer (not shown) of an external memory 22, and the external memory 22 outputs the configured screen data directly to the display unit 21.

This second related art display method is advantageous in that a lesser number of clock cycles are required for the transfer of screen information, and display data can be output to the display unit 21 more quickly than in the first related art display method.

However, this second related display method suffers deficiencies similar to this first method, in that performance of the display unit is still somewhat limited by the reading/writing time required by the external memory 22, a transfer rate between the external memory 22 and the controller 23, and a transfer rate between the external memory 22 and the display unit 21.

Thus, when screen data is configured in an external memory in accordance with these related art display methods, performance of the display unit is limited by the performance of the external memory and the interface speed. That is, since the output speed of the display unit is limited by a reading/writing time from/into the external memory by the controller, a data transfer rate between the external memory and the controller, and a data transfer rate between the external memory and the display unit, the related art mobile terminal cannot take advantage of the enhanced display capabilities associated with a high performance display unit.

SUMMARY OF THE INVENTION

An object of the invention is to solve at least the above problems and/or disadvantages and to provide at least the advantages described hereinafter.

To achieve at least the above objects in whole or in parts, there is provided a system for controlling display of a mobile terminal including: a display unit for displaying various screen data; and a controller having a screen output buffer for the display unit and outputting screen data stored in the screen output buffer directly to the display unit.

Preferably, the controller includes: a screen output buffer allocated for a certain region of the internal memory; and a display interface for transmitting screen data outputted from the screen output buffer to the display unit.

Preferably, the internal memory is a random access memory (RAM).

To achieve at least these advantages in whole or in parts, there is further provided a method for controlling display of a mobile terminal including: allocating a screen output buffer in an internal memory; configuring screen data in the screen output buffer when screen information is inputted from outside; and reading by a controller screen data from the screen output buffer and outputting it directly to a display unit when the screen data configured in the screen output buffer is requested to be outputted.

Preferably, writing and reading operation of the screen output buffer is performed according to a clock cycle of an internal bus of the controller and the read screen data is outputted through a display interface of the controller.

To achieve at least these advantages in whole or in parts, there is further provided a system for controlling display of a mobile terminal, including a display unit configured to display screen data on a screen of the display unit, and a controller comprising a screen output buffer portion configured to receive and to store screen data, wherein the controller is configured to output screen data stored in the screen output buffer portion directly to the display unit.

To achieve at least these advantages in whole or in parts, there is further provided a method for controlling a display of a mobile terminal, including allocating a screen output buffer portion in an internal memory of a controller of the mobile terminal, configuring screen data in the screen output buffer portion when screen information is input from an external source, and reading screen data from the screen output buffer portion of the controller and outputting the screen data directly to a display unit of the mobile terminal in response to a request for the screen data configured in the screen output buffer to be output, wherein reading the screen data and outputting the screen data is done by the controller.

To achieve at least these advantages in whole or in parts, there is further provided a system for controlling a mobile terminal, including a controller which transmits screen data to a display of the terminal, and a memory included within the controller for storing the screen data.

To achieve at least these advantages in whole or in parts, there is further provided a method for controlling a mobile terminal, including storing screen data in an internal memory of a controller, and transmitting the screen data from the memory to a display of the terminal.

To achieve at least these advantages in whole or in parts, there is further provided a mobile terminal, including a display unit, and a controller having an internal memory for storing screen data and an interface which transfers the screen data from the memory to the display unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, wherein.

DETAILED DESCRIPTION OF PREFERRED EMBODIMENTS

A system and method for controlling a high performance display unit of a mobile terminal by using a memory provided in a controller, such as, for example, a CPU, is provided. In this system and method, screen output data is configured by an internal memory of the controller, and not by an external memory of the controller, and screen output data is transmitted directly from the internal memory to the display unit. Further, the screen output buffer, which is, in the related art, allocated to the external memory of the controller, is instead allocated to the internal memory region of the controller, and an interface is provided which allows the screen output data to be output directly from the controller to the display unit. Using this system and method, screen information (data) may be configured and transmitted based on a bus clock cycle of a high speed controller so as to fully utilize the enhanced display characteristics associated with a high performance display unit.

Figure 1:
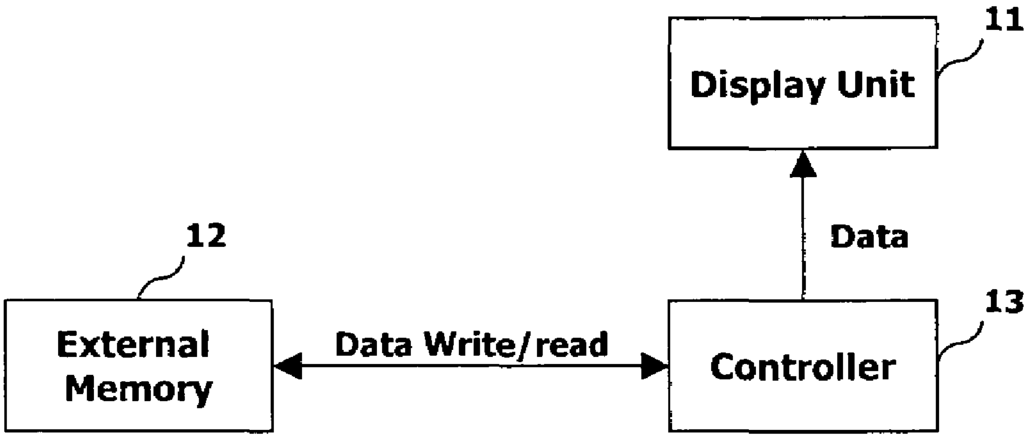
FIG.1 Related Art
FIG. 1 shows a related art display control system in accordance with a first related art display method.
Figure 2:
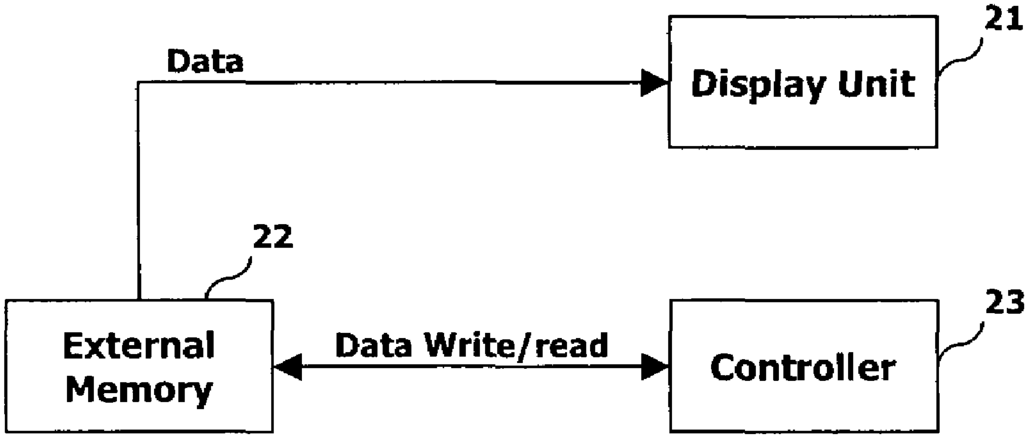
FIG.2 Related Art
FIG. 2 shows a related art display control system in accordance with a second related art display method.
Figure 3:
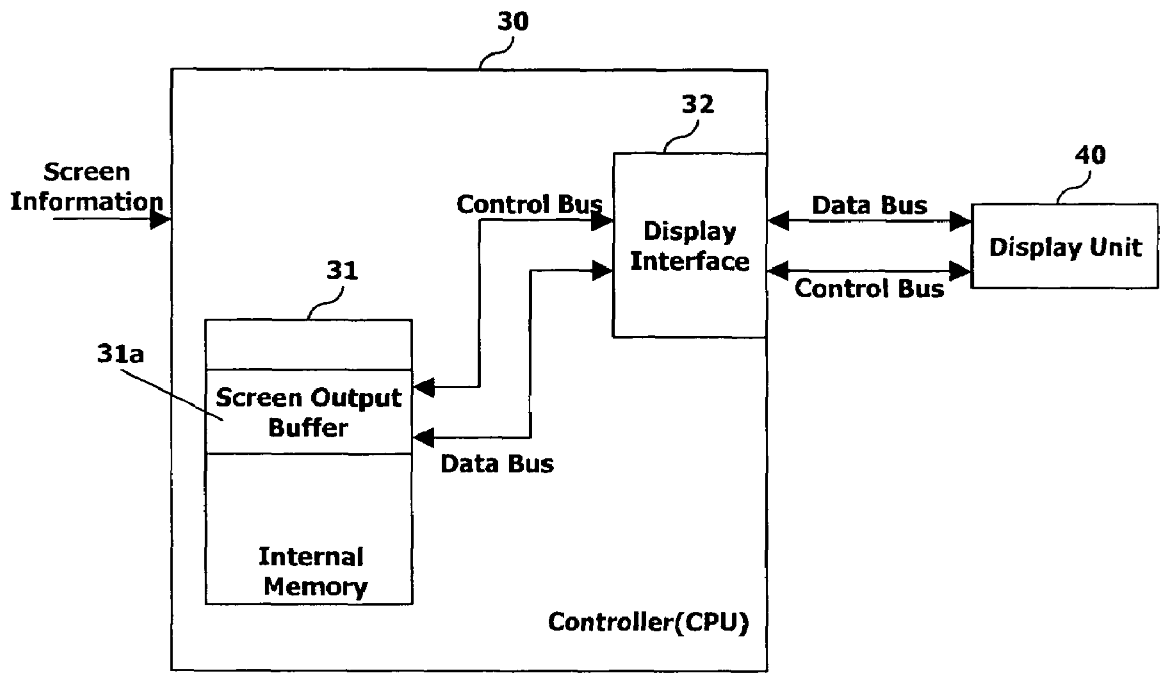
FIG. 3 shows a system for controlling a display of a mobile terminal in accordance with an embodiment of the invention.

As shown in FIG. 3, a display control system in accordance with an embodiment of the invention includes a controller 30 for outputting screen information (data). The screen information is stored in an internal memory 31 of the controller 30, and is output through a display interface 32. A display unit 40 is provided for displaying the screen information output by the controller 30.

A screen output buffer 31*a* for temporarily storing data to be output to the display unit 40 is allocated a predetermined region of the internal memory 31. The internal memory 31 may be a RAM, or any other such data storage device. Data writing/reading to/from the screen output buffer 31*a* is performed based on an internal bus clock cycle of the controller 30. The output buffer and internal memory may be located within a same chip, package, or module as other circuits of the controller, as well as the same printed circuit board. The display interface may also be located on the same chip, package, module, or board.

The operation of the system for controlling display of a mobile terminal constructed as described above will now be described with reference to FIGS. 3 and 4.

Figure 4:
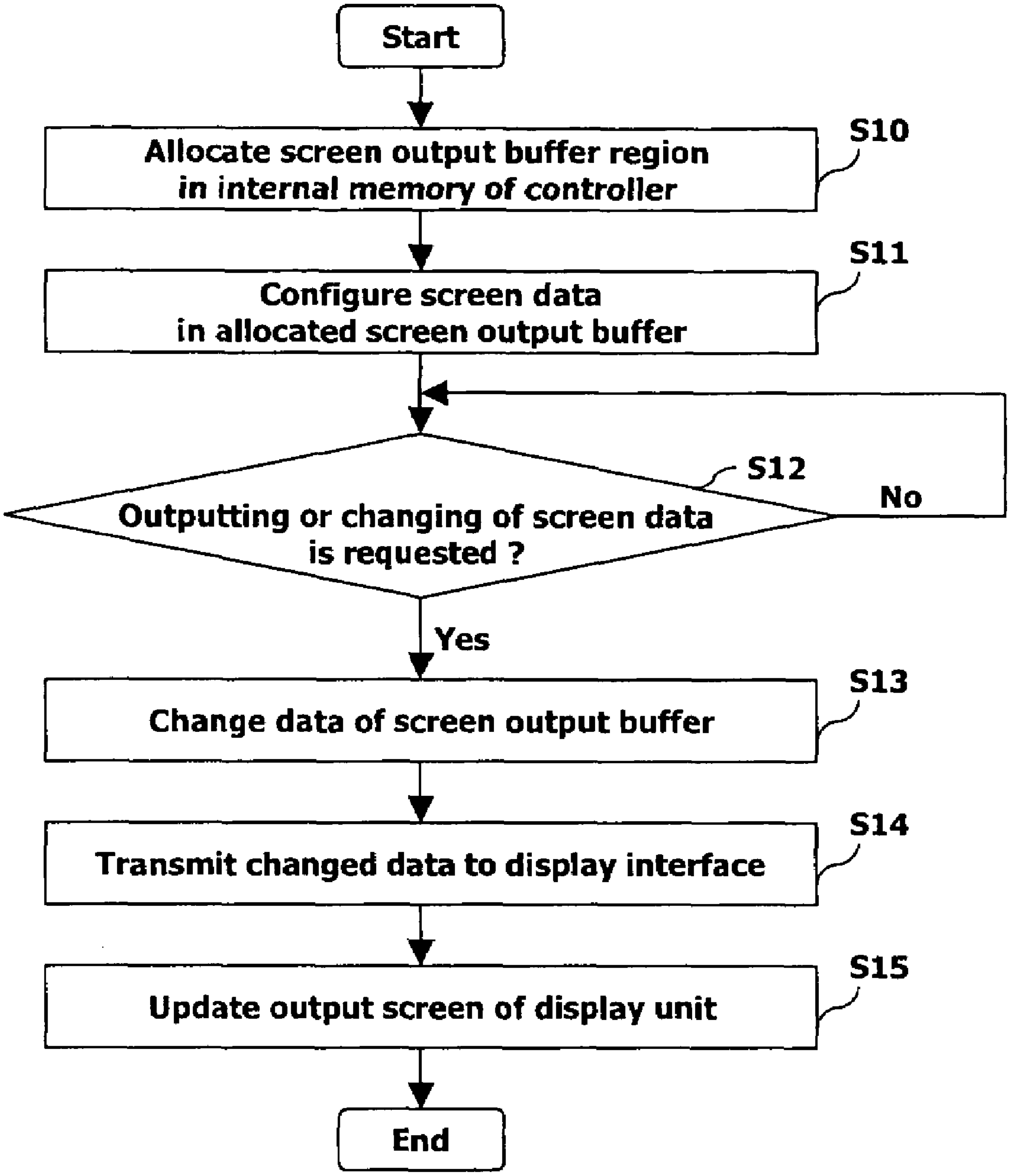
FIG. 4 is a flow chart of a method for controlling a display of a mobile terminal in accordance with an embodiment of the invention.

As shown in FIG. 4, a predetermined region of the internal memory 31 is allocated as a region for the screen output buffer 31*a* (step S10). The predetermined region allocated for the screen output buffer 31*a* may be determined by a manufacturer.

When screen information is provided by, for example, an external source, the controller 30 configures the screen data by storing the input screen information in the screen output buffer 31*a* (step S11). The screen data stored in the screen output buffer 31*a* is continuously changed based on input screen information, and reading/writing of data from/to the screen output buffer 31*a* is performed based on an internal bus clock cycle associated with a control bus of the controller 30.

Thereafter, the controller 30 checks for a request to output or to change the configured screen data (step S12). If a request for outputting or changing the screen data is detected, the controller 30 changes the screen data stored in the screen output buffer 31*a* (step S13) and outputs the changed screen data to the display interface 32 via the screen output buffer 31*a* (step S14). A data bus is provided for transmitting and receiving the screen data between the internal memory 31 and the display interface 32. Once the screen data is received by the display interface 32, the display interface 32 can transmit screen data to the display unit 40. Thus, screen data transferred to the display interface 32 through the data bus after being read from the screen output buffer 31*a* is transferred to the display unit 40 through the data bus, thereby updating the screen of the display unit 40 (step S15).

In this manner, screen data stored in the internal memory is output directly to the external display unit based on a clock cycle of the controller. This allows for a high transfer rate of the screen data due to the high processing rate of the internal memory. Thus, screen data can be displayed and updated on a high performance display unit at an optimum speed.

As embodied and broadly described herein, the system and method for controlling a high performance display unit used for a mobile terminal have the following advantages.

That is, the internal memory of the controller includes a screen output buffer region to store screen data, and the stored screen data is directly transmitted to the display unit, thereby increasing display speed.

Therefore, the system and method for controlling a display unit of a mobile terminal as embodied and broadly described herein is capable of improving an output speed of a display unit, and of achieving optimum screen output efficiency by using a high performance display unit.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A system for controlling display of a mobile terminal, comprising:

a display unit configured to display screen data on a screen of the display unit; and a central processing unit (CPU) comprising:

a display interface, an internal memory, an internal data bus coupled between the internal memory and display interface, and a screen output buffer portion included within or coupled to the internal memory and configured to receive and to store screen data, wherein the CPU, display interface, internal memory, internal data bus, and screen output buffer portion are all located on a single integrated circuit chip, the CPU is configured to control output of the screen data stored in the screen output buffer portion directly to the display device along a signal path that passes through the internal data bus and display interface, the screen data is output directly to the display device along said signal path based on one clock cycle of the internal data bus, and wherein writing screen data to the screen output buffer portion and reading screen data from the screen output buffer portion is performed within a single clock cycle of the internal data bus of the CPU.

2. The system of claim 1, wherein the screen data is stored in a screen output buffer portion of the internal memory, and wherein the CPU is configured to change the data stored in the screen output buffer portion in response to a request to change the screen.

3. The system of claim 1, wherein the screen data is stored in a screen output buffer portion allocated within a predetermined region of the internal memory of the CPU.

4. The system of claim 3, wherein the internal memory comprises a random access memory (RAM).

5. The system of claim 1, wherein the screen data is output directly to the display interface along said path without passing through another controller.

6. A method for controlling a display of a mobile terminal, comprising:

allocating a screen output buffer portion in an internal memory of a central processing unit (CPU) of the mobile terminal, the CPU further comprising a display interface and a internal data bus coupled between the display interface and the screen output buffer portion;

configuring screen data in the screen output buffer portion when screen information is input from an external source; and reading screen data from the screen output buffer portion of the CPU and outputting the screen data directly to a display unit of the mobile terminal in response to a request for the screen data configured in the screen output buffer to be output, wherein reading the screen data is controlled by the CPU, wherein the read screen data is output directly to the display device along a signal path that passes through the internal data bus and display interface, wherein the screen data is output directly to the display device along said signal path based on one clock cycle of the internal data bus, wherein the CPU, display interface, internal memory, internal data bus, and screen output buffer portion are all located on a single chip, and wherein writing screen data to the screen output buffer portion and reading screen data from the screen output buffer portion is performed within a single clock cycle of the internal data bus of the CPU.

7. The method of claim 6, wherein the internal memory comprises a random access memory (RAM).

8. A system for controlling a mobile terminal, comprising:

a central processing unit (CPU) which transmits screen data to a display of the terminal; the CPU including:

a display interface, a memory configured to store the screen data; and a internal data bus coupled between the memory and display interface, wherein the CPU controls output of the screen data stored in the memory directly to the display device along a signal path that passes through the internal data bus and display interface, wherein the screen data is output directly to the display device along said signal path based on one clock cycle of the internal data bus, wherein the CPU, display interface, memory, and internal data bus are all located on a single chip, and wherein writing screen data to the screen output buffer portion and reading screen data from the screen output buffer portion is performed within a single clock cycle of the internal data bus of the CPU.

9. The system of claim 8, further comprising:

a buffer that temporarily stores the screen data before the screen data is transmitted to the display device.

10. The system of claim 9, wherein the buffer is included within a predetermined region of the memory.

11. The system of claim 9, wherein the CPU changes the screen data in the buffer in response to a change request.

12. The system of claim 9, further comprising:

a control bus that carries signals to control when data is to be written into or read from the buffer.

13. The system of claim 8, wherein the CPU transmits the screen data to the display device without storing the screen data in a memory external to the CPU.

14. A method for controlling a mobile terminal, comprising:

storing screen data in an internal memory of a central processing unit (CPU), the CPU further including a display interface and a internal data bus coupled between the memory and the display interface; and transmitting the screen data from the memory to a display device of the terminal, wherein the CPU is configured to control transmission of the screen data from the memory to the display device along a signal path that passes through the internal data bus and display interface, the screen data transmitted to the display device along said signal path based on one clock cycle of the internal data bus, wherein the CPU, internal memory, display interface, and internal data bus are all located on a single chip, and wherein writing screen data to the screen output buffer portion and reading screen data from the screen output buffer portion is performed within a single clock cycle of the internal data bus of the CPU.

15. The method of claim 14, further comprising:

storing the screen data in a buffer before the screen data is transmitted to the display device.

16. The method of claim 15, wherein the buffer is included in a predetermined region of the memory.

17. The method of claim 15, further comprising:

changing the screen data in the buffer in response to a change request.

18. The method of claim 14, wherein the screen data is transmitted to the display device without storing the screen data in a memory external to the CPU.

19. The method of claim 14, wherein the memory is a buffer that temporarily stores the screen data transmitted to the display device.

20. A mobile terminal, comprising:

a display unit, and a central processing unit (CPU) having an internal memory configured to store screen data, an interface coupled to the display device, and a internal data bus that transfers the screen data from the memory to the display device along a signal path that passes through the internal data bus and interface, the screen data transferred to the display device along said path based on one clock cycle of the internal data bus, wherein the CPU, internal memory, memory, and internal data bus are all located on a single chip, and wherein writing screen data to the screen output buffer portion and reading screen data from the screen output buffer portion is performed within a single clock cycle of the internal data bus of the CPU.

21. The terminal of claim 20, further comprising:

a buffer configured to store the screen data before the screen data is transferred to the display device, said buffer being allocated as a predetermined region of the internal memory.

22. The terminal of claim 21, further comprising:

a bus within the CPU that carries control signals between the display device and the interface coupled to the buffer.

23. The central processing unit of claim 20, wherein the internal memory is a buffer that temporarily stores the screen data transferred to the display device.

24. A central processing unit for a mobile terminal, comprising:

an internal memory region allocated to temporarily store screen output data;

a display interface cooperating with the internal memory region to allow transfer of the screen output data to a display unit of the mobile terminal; and an internal bus between the internal memory region and the display interface, wherein the screen output data stored in the internal memory region is output directly to the display interface along a signal path that passes through the internal bus based on one clock cycle of the internal bus, thereby facilitating a high transfer rate of the screen output data to the display interface, the screen output data output directly to the display interface along said path without passing through another controller, wherein the internal memory, display interface, and internal bus of the central processing unit are all located in a single chip, and wherein writing screen data to the screen output buffer portion and reading screen data from the screen output buffer portion is performed within a single clock cycle of the internal data bus of the CPU.

25. The central processing unit of claim 24, wherein the internal bus comprises a data bus and a control bus, wherein the data bus carries the screen output data and the clock cycle of the internal bus is associated with the control bus.

26. The central processing unit of claim 24, wherein the internal memory is a buffer that temporarily stores the screen data output to the display device.

* * * * *